(12) United States Patent
Yamaguchi et al.

(10) Patent No.: US 7,067,762 B2
(45) Date of Patent: Jun. 27, 2006

(54) PLASMA CUTTING PROCESS AND MACHINE

(75) Inventors: Yoshihiro Yamaguchi, Kaga (JP); Tetsuya Kabata, Kaga (JP); Kazuhiro Kuraoka, Komatsu (JP); Takahiro Iriyama, Komatsu (JP)

(73) Assignee: Komatsu Industries Corporation, Tokyo (JP)

( * ) Notice: Subject to any disclaimer, the term of this patent is extended or adjusted under 35 U.S.C. 154(b) by 125 days.

(21) Appl. No.: 10/723,796

(22) Filed: Nov. 25, 2003

(65) Prior Publication Data

US 2004/0112875 A1   Jun. 17, 2004

(30) Foreign Application Priority Data

Dec. 12, 2002  (JP) ............................. 2002-360129

(51) Int. Cl.
*B23K 10/00* (2006.01)

(52) U.S. Cl. .......................... 219/121.44; 219/121.39; 219/121.48; 219/121.59

(58) Field of Classification Search ........... 219/121.39, 219/121.44, 121.45, 121.46, 121.59, 121.36, 219/137 R
See application file for complete search history.

(56) References Cited

U.S. PATENT DOCUMENTS 6,335,507 B1 *  1/2002  Nakata et al. ......... 219/121.67

FOREIGN PATENT DOCUMENTS

| JP | 6-262367 A | 9/1994 |
|----|------------|--------|
| JP | 7-26054 Y2 | 6/1995 |
| JP | 2000-246446 A | 9/2000 |
| WO | WO 90/15688 | * 12/1990 |

* cited by examiner

*Primary Examiner*—Mark Paschall
(74) *Attorney, Agent, or Firm*—Frishauf, Holtz, Goodman & Chick, P.C.

(57) ABSTRACT

A plasma cutting machine is provided in which a dross adhesion inhibitor is jetted from a plasma torch toward the cutting start position (piercing position) of the object material. A dross adhesion inhibitor supply flow path for feeding the dross adhesion inhibitor is connected to an assist gas feeding line in which an assist gas for assisting cutting of the object material with the plasma arc flows.

5 Claims, 4 Drawing Sheets

PLASMA CUTTING PROCESS AND MACHINE

TECHNICAL FIELD

The present invention relates to a plasma cutting process and plasma cutting machine in which a plasma arc is generated from a plasma torch to cut an object material and more particularly relates to a plasma cutting process and plasma cutting machine which are capable of preventing adhesion and deposition of dross produced during piercing operation.

BACKGROUND ART

There are generally known two ways of cutting a steel plate into various shapes. In one method, cutting is started from an end of the steel plate. Another method is "piercing start" in which a through hole is formed at a desired position of the steel plate and cutting is started from the through hole. The latter method, "piercing start" is prevailing in the field of automatic cutting by use of an NC device because a workpiece of a desired shape can be cut out of a steel plate.

In conventional cases where a steel plate is cut with a plasma cutting machine by effecting piercing start, during a piercing operation prior to a cutting operation, in which a through hole is made at a cutting start position by a plasma arc generated from the plasma torch, the metal melted by the plasma arc is blown onto the periphery of the hole so that the molten metal adheres to and deposits on the periphery as dross. The dross may contact the leading end of the plasma torch which has been lowered to start a cutting operation, so that the nozzle is melted and damaged. It also could be a cause of occurrence of a double arc which gives damage to the nozzle so that the cutting quality of the product significantly degrades. Especially where a steel plate having a thickness of more than 6 mm or 9 mm is cut, the adverse effects of the dross formed during the piercing operation are no longer negligible. As a means for protecting the nozzle from the dross produced at the time of piercing, there is known an arrangement in which a shield cap is provided outside the nozzle and an assist gas (secondary gas) is jetted from the space between the nozzle and the shield cap. This means has however proved unsuccessful in avoiding the adverse effects of the dross when cutting a steel plate having a thickness of more than 16 mm.

As an attempt to avoid the adverse effects of the dross, the plasma cutting machine 50 shown in FIG. 4 has been proposed in Japanese Utility Model Publication Kokoku No. 7-26054. The plasma cutting machine 50 has a nozzle 52 disposed beside a plasma torch 51 for jetting a dross adhesion inhibitor for preventing the adhesion of dross. In the plasma cutting machine 50, the following operation is performed: The plasma torch 51 is first moved to a position above the cutting start position of a steel plate W and then, the dross adhesion inhibitor is jetted from the nozzle 52 provided for the plasma torch 51 toward the cutting start position for about 2 seconds. After effecting an operation called "pre-flow" as a preparatory step for plasma arc generation for about 2 seconds, in which plasma gas or the like is jetted from the plasma torch 51 to purge residual gas from the plasma torch 51, a plasma arc is generated from the plasma torch 51 thereby performing a cutting operation started by a piercing start. A film of the dross adhesion inhibitor is thus formed on the cutting start position beforehand so that the adhesion/deposition of the dross generated during piercing can be prevented. In FIG. 4, reference numeral 53 designates a tank for storing the dross adhesion inhibitor. Reference numeral 54 designates a pump for feeding the dross adhesion inhibitor from the tank 53 to the nozzle 52 and reference numeral 55 designates a line for feeding compressed air to the nozzle 52, the compressed air being used for jetting the dross adhesion inhibitor.

Examples of the dross adhesion inhibitor used herein are liquid formulations which are called "laser-non-dross", formed by dispersing carbon into a solvent and applied to the rear face of an object material for preventing dross adhesion in laser cutting; and solvents which are applied to the front face of a part in the vicinity of a welding area in order to prevent spatter generated in arc welding from adhering to the surroundings. Machine lubricant oils, edible oils and aqueous solutions containing resin may be used as the dross adhesion inhibitor, because solvents containing grease have the effect of preventing dross adhesion.

As techniques associated with the prior art, there have been proposed (i) a plasma cutting machine (see Japanese Patent Publication Kokai No. 6-262367) in which a cooling gas mixing member is disposed outside or inside the plasma torch for generating a gaseous mixture of cooling gas and water and the gaseous mixture of cooling gas and water is jetted to the cut face of the steel plate together with a plasma arc; and (ii) a spatter adhesion preventing method (Japanese Patent Publication Kokai No. 2000-246446) which uses a welding torch designed to selectively supply shield gas and air for use in blowing to a gas passage formed in the welding torch and in which a spatter adhesion inhibitor liquid is applied to the inside of the nozzle of the welding torch and to the contact tube by introducing the spatter adhesion inhibitor liquid into the blowing air in the form of mist.

The plasma cutting machine 50 disclosed in Japanese Utility Model Publication Kokai No. 7-26054 is formed such that the dross adhesion inhibitor is jetted toward the cutting start position from the nozzle 52 disposed beside the plasma torch 51. Even if the dross adhesion inhibitor is jetted during pre-flow, it is interrupted by plasma gas or the like jetted at the time of pre-flow so that the dross adhesion inhibitor cannot be applied to the cutting start position. Therefore, the operation of jetting the dross adhesion inhibitor has to be performed prior to pre-flow as noted earlier. For this reason, a time (about 2 seconds) is required for application of the dross adhesion inhibitor before a start of every cutting operation, which increases the cycle time, resulting in a decline in the productivity. Since the dross adhesion inhibitor jetting position is off to upper right or left of the cutting start position, there is the possibility of missing the target. Additionally, the dross adhesion inhibitor applied to the steel plate W is blown and scattered at the time of pre-flow. In view of these facts, a considerable amount of dross adhesion inhibitor needs to be jetted for reliable formation of a film of the dross adhesion inhibitor at the cutting start position, which involves additional running cost. In addition, since a considerable amount of dross adhesion inhibitor is thus jetted onto the cutting start position, the upper face of the steel plate W in the area around the cutting start position is smudged with excessive dross adhesion inhibitor. Where a dross adhesion inhibitor containing grease is used, it cannot be removed by natural drying and therefore, there arises, in some cases, a need for wiping out the excessive dross adhesion inhibitor after completion of cutting. This requires additional labor. Further, since the nozzle 52 for jetting the dross adhesion inhibitor is off to the upper right or left of the cutting start position, there is a likelihood of occurrence of such troubles that the jet orifice of the nozzle 52 is clogged with molten metal (spatter) scattering at the time of piercing or the leading end of the nozzle 52 is melt down.

In the plasma cutting machine disclosed in Japanese Patent Publication Kokai No. 6-262367, the liquid contained in the gaseous mixture of gas/liquid jetted from the plasma torch is water used for cooling. According to the test made by the inventors, the surface of the steel plate at the cutting start position needs to be covered with a film containing grease or carbon in order to prevent dross adhesion. In view of this, the dross adhesion inhibiting effect cannot be expected from the technique disclosed in Japanese Patent Publication Kokai No. 6-262367 according to which the surface of the steel plate at the cutting start position is covered with water.

According to the spatter adhesion preventing method disclosed in Japanese Patent Publication Kokai No. 2000-246446, since the air for blowing is selected to be fed to the gas passage within the welding torch at the time of initial set-up during off-line and the air for blowing is mixed with the spatter adhesion inhibitor, a reduction in the cycle time cannot be expected. Further, this spatter adhesion preventing method is directed to prevention of adhesion of spatter to the inside of the nozzle of the welding torch and to the contact tube and therefore differs from the present invention in terms of objects.

The invention has been made taking the above problems into consideration and a primary object of the invention is therefore to provide a plasma cutting process and plasma cutting machine capable of reliably applying a necessary amount of dross adhesion inhibitor to a cutting start position of an object material, which leads to prevention of adhesion/deposition of dross, improved productivity due to a reduction in the cycle time, a reduction in the running cost and man hour, and improved reliability.

DISCLOSURE OF THE INVENTION

The above object can be accomplished by a plasma cutting process according to the invention, for cutting an object material with a plasma arc generated from a plasma torch, wherein a dross adhesion inhibitor for preventing adhesion of dross generated by the plasma torch is jetted onto a cutting start position of the object material.

According to the invention, since a dross adhesion inhibitor is jetted onto a cutting start position of an object material from the plasma torch, the dross adhesion inhibitor can be accurately applied to the cutting start position and application of the dross adhesion inhibitor to the cutting start position can be carried out without being interrupted by plasma gas or the like jetted during pre-flow. Therefore, not only the effect of preventing dross adhesion/deposition can be attained but also the dross adhesion inhibitor can be jetted simultaneously with pre-flow, so that a reduced cycle time and improved productivity can be achieved. In addition, the dross adhesion inhibitor can be jetted in a necessary amount at the time of application of the dross adhesion inhibitor to the cutting start position, which reduces the running cost of the cutting machine compared to the prior art and obviates the need for a conventionally required, dross adhesion inhibitor wiping process subsequent to a completion of cutting so that the required man hour can be reduced. Further, since the plasma torch itself has the function of jetting the dross adhesion inhibitor to the cutting start position, the probability of occurrence of troubles in the jetting operation owing to spatter produced during piercing is significantly reduced, leading to improved reliability.

In the invention, the jetting of the dross adhesion inhibitor from the plasma torch is preferably stopped during cutting of the object material with the plasma arc. This prevents the dross adhesion inhibitor from adversely affecting the plasma arc so that the cutting condition can be maintained in a good state.

According to the invention, there is provided a plasma cutting machine for cutting an object material with a plasma arc generated from a plasma torch, wherein the plasma torch includes jetting means for jetting a dross adhesion inhibitor for preventing dross adhesion onto a cutting start position of the object material.

The invention is associated with a machine which puts the function and effects of the above-described plasma cutting process into practice. According to the invention, the plasma torch is placed at a specified position relative to the cutting start position of the object material and then, the dross adhesion inhibitor is jetted onto the cutting start position from the plasma torch by actuating the jetting means simultaneously with pre-flow. Accordingly, the same effects as those of the above plasma cutting process can be achieved.

In the invention, the jetting means is preferably designed such that a dross adhesion inhibitor supply flow path for feeding the dross adhesion inhibitor is connected to an assist gas flow path in which an assist gas for assisting cutting of the object material carried out with the plasma arc flows after jetted from the plasma torch along the plasma arc. Further, the jetting means may be formed such that the dross adhesion inhibitor supply flow path for feeding the dross adhesion inhibitor is connected to a plasma gas flow path in which a plasma gas used for forming the plasma arc flows. By use of such jetting means, a gaseous mixture produced by mixing the assist gas or plasma gas with the dross adhesion inhibitor is jetted from the plasma torch to the cutting start position and application of the dross adhesion inhibitor to the cutting start position is carried out simultaneously with pre-flow, so that the desired object can be accomplished with a simple structure and such jetting means can be applicable to any equipment irrespective of newly built or existing.

BEST MODE FOR CARRYING OUT THE INVENTION

Referring now to the accompanying drawings, a plasma cutting process and plasma cutting machine will be hereinafter described according to a preferred embodiment of the invention.

Figure 1:
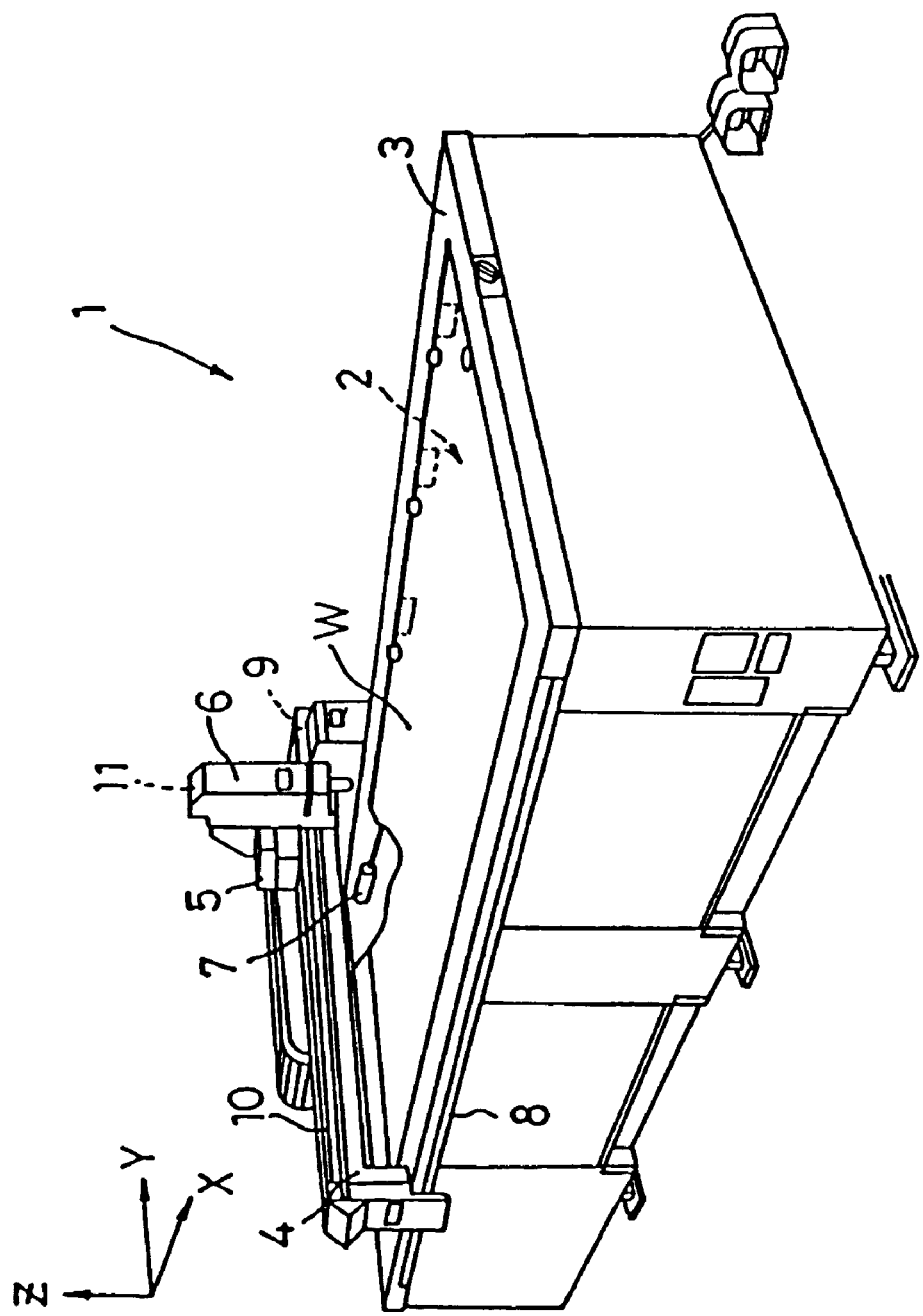
FIG. 1 is a general perspective view of a plasma cutting machine according to one embodiment of the invention.
Figure 2:
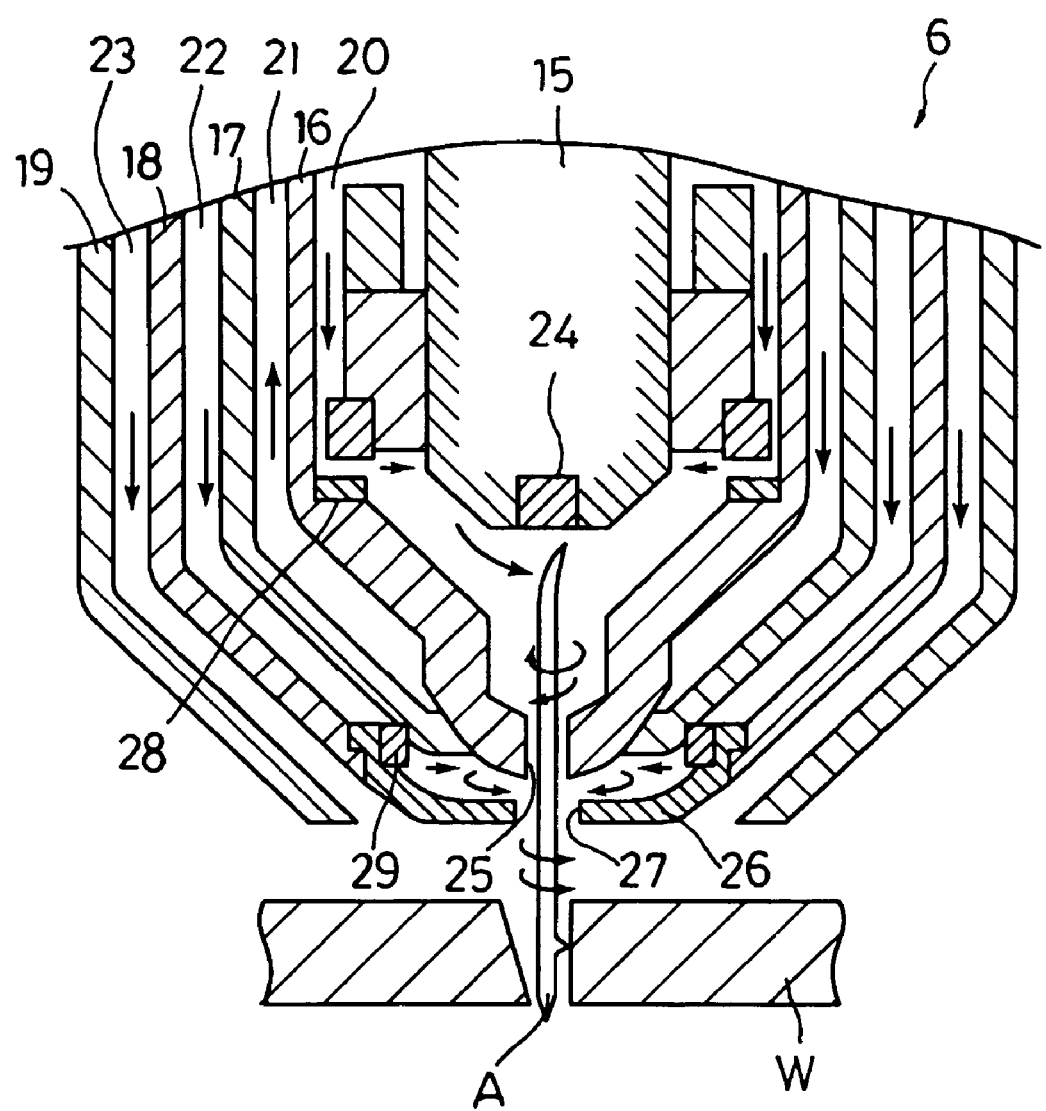
FIG. 2 is an essential portion longitudinal sectional view of a plasma torch according to the embodiment.

FIG. 1 shows a general perspective view of a plasma cutting machine according to an embodiment of the invention. FIG. 2 shows an essential portion longitudinal sectional view of a plasma torch according to the embodiment.

In the plasma cutting machine 1 of this embodiment, a cutting platen (cutting table) 2 for supporting a steel plate W, that is, an object material is disposed in the space inside a rectangular frame 3 and a portal traveling beam 4 is disposed so as to stride the frame 3. Disposed on the traveling beam 4 is a carriage 5 on which a plasma torch 6 is mounted.

The traveling beam 4 is movable by operation of an X-axis motor 7 in the direction of the X-axis along an X-axis rail 8 which extends in a longitudinal direction (i.e., the X-axis direction) of the frame 3. The carriage 5 is movable by operation of a Y-axis motor 9 in the direction of the Y axis along a Y-axis rail 10 disposed on the traveling beam 4. The plasma torch 6 is movable by operation of a Z-axis motor 11 in a vertical direction (i.e., the Z-axis direction) relative to the carriage 5. By controlling each motor 7, 9, 11, the plasma torch 6 is moved to a desired position of the steel plate W and positioned at a desired level to cut the steel plate W. Although a detailed illustration of the plasma torch 6 is omitted herein, it should be noted that an electrode 15 (described later) is connected, through a torch cable for supplying plasma current, to one terminal (minus terminal) of a plasma power source unit and the other terminal (plus terminal) of the plasma power source unit is connected to the steel plate W (or the cutting platen 2) through a parent material cable. The circuit for the steel plate W diverges and is then connected to a nozzle 16 through a resister and an on-off switch.

The plasma torch 6 has a substantially multiple cylindrical shape as shown in FIG. 2 and comprises (i) the centrally-located, substantially cylindrical electrode 15, (ii) the substantially cylindrical nozzle 16 disposed so as to enclose the periphery of the electrode 15, (iii) a substantially cylindrical, first nozzle cap 17 disposed at the outer circumferential side of the nozzle 16, (iv) a substantially cylindrical, second nozzle cap 18 disposed at the outer circumferential side of the nozzle cap 17, and (v) a substantially cylindrical, third nozzle cap 19 disposed at the outer circumferential side of the nozzle cap 18. The leading end open space defined by the electrode 15 and the nozzle 16 is a plasma gas passage (plasma gas flow path) 20 for plasma gas used for forming a plasma arc A, and the closed space defined by the nozzle 16 and the first nozzle cap 17 is a cooling water passage 21 for cooling water used for cooling the nozzle 16. The leading end open space defined by the first nozzle cap 17 and the second nozzle cap 18 is an assist gas passage (assist gas flow path) 22 for assist gas which is jetted along the plasma arc A to assist cutting of the steel plate W carried out with the plasma arc A. The leading end open space defined by the second nozzle cap 18 and the third nozzle cap 19 is a shield gas passage (shield gas flow path) 23 for shield gas used for shielding the plasma gas and the assist gas. In this embodiment, oxygen is used as the plasma gas and air is used as the assist gas and the shield gas.

Attached to the leading end (serving as a plasma arc generating point) of the electrode 15 is a heat-resistant insert 24 made from a high melting point material (e.g., hafnium, zirconium and alloys) which can withstand the high heat of the plasma arc A.

A nozzle orifice 25 is provided at the leading end of the nozzle 16 and a shield cap 26 is provided at the leading open end of the second nozzle cap 18. The plasma gas passage 20 and the assist gas passage 22 have a first swirler 28 and second swirler 29, respectively, inserted therein. The plasma gas passing through the plasma gas passage 20 is formed into a spiral flow by the first swirler 28 and this spiral flow of plasma gas is jetted from the nozzle orifice 25 to the steel plate W. Similarly, the assist gas passing through the assist gas passage 22 is formed into a spiral flow by the second swirler 29 and this spiral flow of assist gas is jetted from an exhaust nozzle 27 to the steel plate W. With such double spiral flows, the shape of the cut groove of the steel plate W can be varied and a right-angled cut face can be obtained by controlling the respective feeding amounts of the plasma gas and assist gas.

In the plasma torch 6 of the above structure, when lighting the pilot arc between the electrode 15 and the nozzle 16 with the plasma gas passage 20 being supplied with the plasma gas, the plasma gas having ionized electrical conductivity is jetted toward the steel plate W through the nozzle orifice 25 so that the plasma arc A is formed between the electrode 15 and the steel plate W. This plasma arc A has high temperature and high density energy because the constraint of the nozzle orifice 25 and the thermal pinching function of the plasma gas flow work effectively. By melting the steel plate W using the plasma arc A thus formed, a piercing operation for forming a through hole at the cutting start position and a cutting operation by a piercing start in which cutting is started from the through hole formed by the piercing operation are executed.

Figure 3:
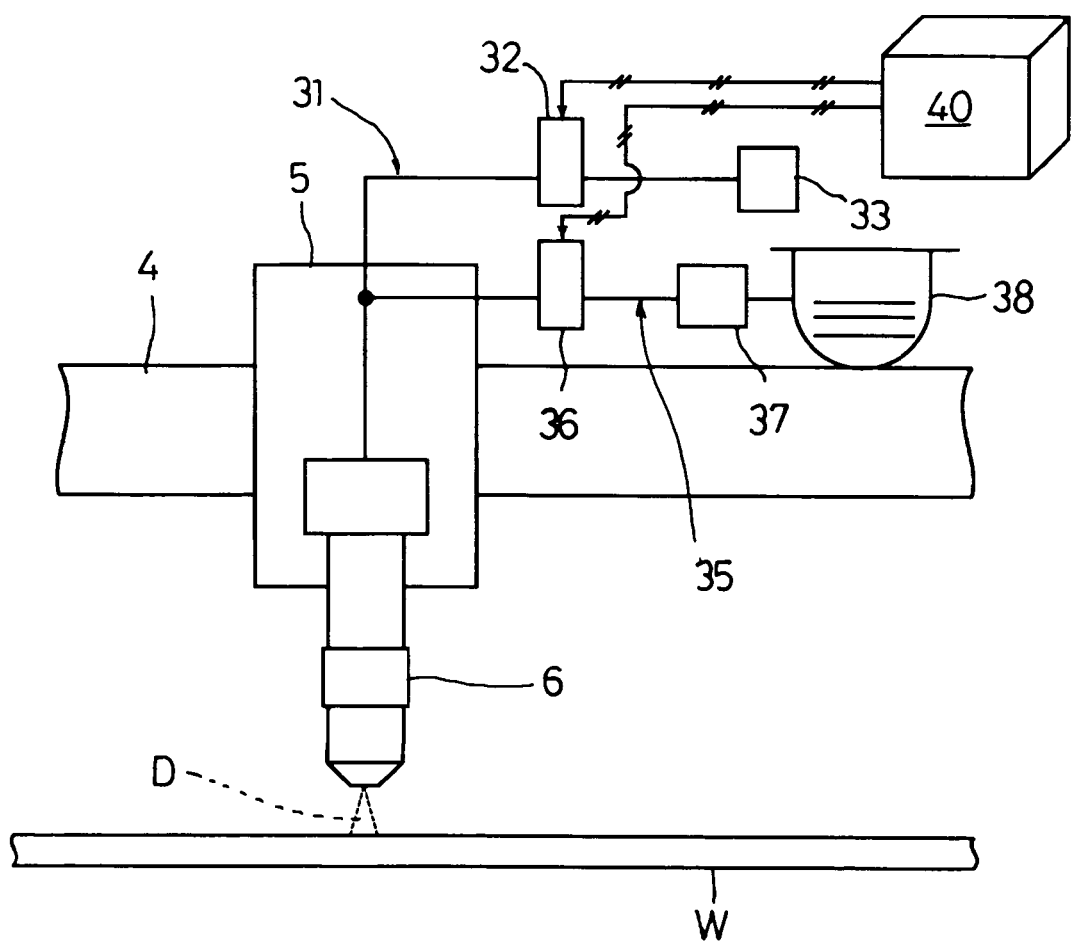
FIG. 3 is a schematic system structural diagram illustrating a jetting mechanism for a dross adhesion inhibitor.
Figure 4:
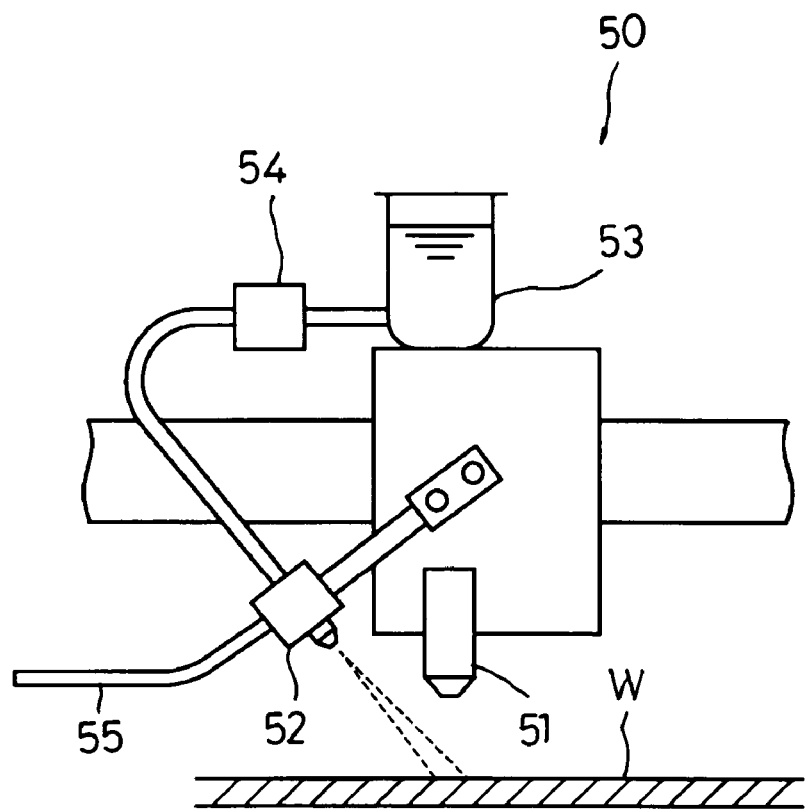
FIG. 4 is a diagram illustrating a jetting mechanism for a dross adhesion inhibitor according to the prior art.

The plasma cutting machine 1 of this embodiment is provided with a jetting mechanism (jetting means) for jetting a dross adhesion inhibitor to the cutting start position in order to prevent adhesion and deposition of molten metal (hereinafter referred to as "dross") generated during the piercing operation. This jetting mechanism will be described below with reference to the schematic system structural diagram of FIG. 3.

The assist gas passage 22 (see FIG. 2) in the plasma torch 6 is connected to an assist gas feeder 33 through an assist gas feeding line 31 in which a solenoid valve 32 is inserted as an opening/closing means for feeding and cutting off the assist gas. The assist gas feeding line 31 and a tank 38 for storing the dross adhesion inhibitor are connected to each other by a dross adhesion inhibitor feeding line 35 in which a solenoid valve 36 serving as an opening/closing means for feeding and cutting off the dross adhesion inhibitor and a pump 37 for sending the dross adhesion inhibitor are inserted in this order from the downstream side. The solenoid valves 32, 36 are respectively, electrically connected to a control unit 40 which is operated in conjunction with the movement of the plasma torch 6 in the Z-axis direction, and a specified control signal is sent from the control unit 40 to the solenoid valves 32, 36. The installing positions of the solenoid valves 32, 36, the pump 37 and the tank 38 are properly determined according to the condition of the machine body and its circumstances. The flow path for the assist gas constituted by the assist gas passage 22 and the assist gas feeding line 31 corresponds to "the assist gas flow path" of the invention. The flow path for feeding the dross adhesion inhibitor constituted by the dross adhesion inhibitor feeding line 35 corresponds to "the dross adhesion inhibitor feeding flow path" of the invention.

Examples of the dross adhesion inhibitor used herein are liquid formulations which are called "laser-non-dross", formed by dispersing carbon into a solvent, and applied to the rear face of an object material for preventing dross adhesion in laser cutting; and solvents which are applied to the front face of a part in the vicinity of a welding area in order to prevent spatter generated in arc welding from adhering to the surroundings. Machine lubricant oils, edible oils and aqueous solutions containing resin may be used as the dross adhesion inhibitor, because solvents containing grease have the effect of preventing dross adhesion.

The dross adhesion inhibitor jetting mechanism having the above structure functions as follows. In the course of the movement of the plasma torch 6 for making its center coincide with the cutting start position (piercing position) which has been predetermined by an NC device (not shown), the operation called "pre-flow" is started, in which the assist gas is jetted from the plasma torch 6 by opening the solenoid valve 32 in response to an instruction from the control unit 40. The pre-flow is performed for the purpose of purging residual gas from the plasma torch 6. In the stage of lowering the plasma torch 6 to a specified level after the center of the plasma torch 6 has coincided with the piercing position, the solenoid valve 36 is opened in response to an instruction from the control unit 40 so that the dross adhesion inhibitor stored in the tank 38 is supplied to the assist gas feeding line 31 by the pump 37. Then, the assist gas flowing in the assist gas feeding line 31 is mixed with the dross adhesion inhibitor, and this gaseous mixture is blown to the cutting start position (piercing position) of the steel plate W through the assist gas passage 22 and the exhaust nozzle 27 (see FIG. 2). After an elapse of a specified time, the solenoid valve 36 is closed in response to an instruction from the control unit 40 to stop the supply of the dross adhesion inhibitor to the assist gas feeding line 31. After that, only the assist gas is jetted from the plasma torch 6. The reason why the supply of the dross adhesion inhibitor is stopped after an elapse of a specified time is that if jetting of the dross adhesion inhibitor is continued during the cutting operation, the dross adhesion inhibitor adversely affects the plasma arc so that a trouble which causes a cutting defect is likely to occur and therefore occurrence of such a trouble has to be prevented.

The dross adhesion inhibitor is applied to the piercing position of the steel plate W by jetting the dross adhesion inhibitor to the piercing position in this way simultaneously with the pre-flow. Then, the plasma arc A is generated from the plasma torch 6 to start a cutting operation by a piercing start to cut a piece having a shape preset in the NC device (not shown) out of the steel plate W. Although a series of operations associated with the application of the dross adhesion inhibitor are performed whenever a piercing start is effected, they are automatically carried out under control of the control unit 40 and therefore man power is unnecessary except when inputting a control program to the control unit 40.

According to the present embodiment, since the dross adhesion inhibitor can be applied to the piercing position of the steel plate W, adhesion and deposition of the dross generated during piercing can be prevented and in consequence, damage to the leading end of the plasma torch 6 and occurrence of double arc can be avoided. The operation for applying the dross adhesion inhibitor to the piercing position is carried out in concurrence with the pre-flow, and therefore the time (about 2 seconds) previously required for application of the dross adhesion inhibitor which was carried out before a start of every cutting operation can be saved. As a result, the cycle time can be reduced by the amount corresponding to the saved time (about 10% of the overall conventional cutting operation) and improved productivity can be achieved. In addition, since the dross adhesion inhibitor is blown from the plasma torch 6 right down to the piercing position, it can be effectively applied to the piercing position, so that even if the amount of the dross adhesion inhibitor jetted is small (about one third to one fifth the amount used in the prior art), the dross adhesion preventing effect can be satisfactorily achieved. This leads to a significant reduction in the running cost. Since there is no need to wipe out excessive dross adhesion inhibitor after completion of cutting, the productivity can be further increased. In addition, since the plasma torch 6 itself has the function of jetting the dross adhesion inhibitor to the piercing position, the probability of occurrence of troubles in the jetting operation due to spatter produced during piercing extremely decreases so that improved reliability can be ensured. As the dross adhesion inhibitor jetting operation proceeds, a film of dross adhesion inhibitor is formed on the outer surface of the nozzle 16 at its leading end, so that the adhesion of spatter to the nozzle 16 is alleviated, resulting in an improvement in the service life of the nozzle 16.

While the present embodiment has been discussed with a case where the gas line into which the dross adhesion inhibitor is introduced is the assist gas feeding line 31, the dross adhesion inhibitor may be introduced into a plasma gas feeding line (not shown) for feeding the plasma gas to the plasma gas passage 20 or a shield gas feeding line (not shown) for feeding the shield gas to the shield gas passage 23.

While the present embodiment has been discussed with a case where the invention is applied to a plasma cutting machine having a table-type system with an X-axis, Y-axis and Z-axis and a plasma torch movable along the Z-axis, it is a matter of course that the invention is also applicable to a plasma cutting machine in which a plasma torch is mounted on a handling machine such as a robot.

It is possible to apply the dross adhesion inhibitor to other desired positions than the piercing position by changing the control program to be input to the control unit 40. Further, the control unit 40 may be integrally formed with a main control unit for the plasma cutting machine 1.

What is claimed is:

1. A plasma cutting process for cutting an object material with a plasma arc generated from a plasma torch, said process comprising:
   supplying a dross adhesion inhibitor into a plasma torch head;
   moving the dross adhesion inhibitor through the plasma torch head to an exhaust nozzle of the plasma torch head through which the plasma arc is formed; and
   jetting the dross adhesion inhibitor from the plasma torch head onto a cutting start position of the object material.

2. The plasma cutting process according to claim 1, wherein the jetting of the dross adhesion inhibitor from the plasma torch is stopped during cutting of the object material with the plasma arc.

3. A plasma cutting machine comprising:
   a plasma torch head for generating a plasma arc for cutting an object material;
   a dross adhesion inhibitor supply unit for supplying a dross adhesion inhibitor into the plasma torch head;
   jetting means for jetting the dross adhesion inhibitor through an exhaust nozzle of the plasma torch head through which the plasma arc is formed onto a cutting start position of the object material.

4. The plasma cutting machine according to claim 3, wherein a dross adhesion inhibitor supply flow path for supplying the dross adhesion inhibitor into the plasma torch head is connected to an assist gas flow path in which an assist gas flows, said assist gas being jetted from the plasma torch along the plasma arc to assist in cutting of the object material by the plasma arc, and the dross adhesion inhibitor flows through the plasma torch head along the assist gas flow path.

5. The plasma cutting machine according to claim 3, wherein a dross adhesion inhibitor supply flow path for supplying the dross adhesion inhibitor into the plasma torch head is connected to a plasma gas flow path in which a plasma gas used for forming the plasma arc flows, and the dross adhesion inhibitor flows through the plasma torch head along the plasma gas flow path.

* * * * *